2,868,644

TRACER ADDITIVES FOR MIXED FEEDS AND METHOD OF USING THE SAME FOR THE DETECTION AND QUANTITATIVE DETERMINATION OF MICRO-INGREDIENTS IN MIXED FEEDS

Sylvan Eisenberg, San Francisco, Calif.

No Drawing. Application February 7, 1956
Serial No. 563,862

6 Claims. (Cl. 99—2)

This invention relates to treatment and analysis of such as foods and drugs, and more particularly to tracer materials and to a method for using such materials as additives in, for example, mixed feeds for animals for the detection and quantitative determination of micro-ingredients, such as medicaments, vitamins, and hormones, in such mixed feeds.

During recent years, the addition of medicaments, vitamins, and hormones to mixed feeds has become general practice. The U. S. Food and Drug Administration permits such additives to be used if, among other things, analytical means and analytical procedure for their determination are available. Such specific analytical procedures are generally costly, time consuming, and impractical for use by manufacturers of mixed feeds for purpose of quality control.

The various problems involved in the manufacture and handling of mixed feeds, such as the obtaining of uniform distribution of the micro-ingredients in the feed material, the need for determining the conformance to specifications of the micro-ingredients present, and the like, are described in detail in U. S. Patent No. 2,712,997, which patent discloses a method for insuring uniformity of distribution of the micro-ingredients comprising the steps of forming a pre-mix of a micro-ingredient, a soluble inorganic nitrite, and an inert carrier, mixing the pre-mix with the feed material, taking a sample of the resulting mix, and preforming an aqueous extraction on the sample to determine the quantity of nitrite therein. While this method is probably quite satisfactory from the standpoint of reliability, it leaves something to be desired from the standpoint of simplicity and rapidity with which it can be carried out.

Any given method for checking mixed feeds approaches the optimum not only in direct relation to the rapidity and inexpensiveness of carrying it out, but also in inverse relation to the amount of equipment required to carry out the method and the skill required of the one who carries it out. The method of the subject invention can be carried out in about three to four minutes time. The cost of employing the tracer materials involved is about two to four cents per ton of the mixed feed material. Also, the subject method requires no unusual or costly equipment, but only such as a piece of filter paper, a graduated centrifuge tube, a simple atomizer and a hot plate. The skill required of the operator is a bare minimum.

The essential object of the invention is to provide a simple, rapid, and inexpensive method for determining the amount and the uniformity of distribution of micro-ingredients in mixed feeds. A further object is to provide a novel combination of tracer material and carrier for the tracer material for use in the method. Other objects and advantages of the invention will be apparent from the following description.

The subject method concerns the use of a detectable labeling compound, or tracer. As a base, or carrier, for the tracer, a material is used which meets the following requirements:

(1) Controlled particle size to enable thorough and homogeneous distribution in the pre-mix formed with the micro-ingredient and in the ultimate mixed feed, and to enable the weight of the particles to be estimated from their number;

(2) A specific gravity greater than 1.5 to permit the sedimenting of the carrier material in suitable solvent;

(3) Insolubility in said solvent; and (4) Non-toxicity to permit admixture with feeds in accordance with the requirements of the law.

Calcium carbonate, calcium phosphate, and sodium chloride are examples of materials which meet these requirements. Carbon tetrachloride and chloroform are examples of such solvents. The term "solvents" is employed although nothing is necessarily dissolved in connection with their use, as will hereinafter appear.

The carrier material is then surface-coated with a tracer material which meets the following requirements:

(1) Solubility in a solvent in which the carrier material is insoluble;

(2) Insolubility in carbon tetrachloride, chloroform, or similar solvent having a specific gravity between approximately 1.4 and 1.6;

(3) Ready identification either by its characteristic color or by way of a sensitive chemical reaction, such as a spot test.

Examples of tracer materials which are suitable for use in connection with the carrier materials are FD&C colors, iron salts, copper salts, and otherwise unobjectionable highly colored materials, such as dyes and indicators, as, for example, phenolphthalein. The term "colored surface coating" used in the claims is intended to embrace all such usable tracer materials, including those which require treatment by a development reaction to produce a visible color.

The tracer additive is prepared by first grading the carrier material to the desired particle size. Particle sizes from below 1 micron up to 30 mesh have been employed successfully. However, the quantitative aspects of the method improve progressively as the particle size range is narrowed. The range between 30 and 150 mesh has been found to be most suitable. Some materials obtainable in crystallized form, such as sodium chloride, are particularly suitable on account of their natural relatively uniform particle size.

Next, the tracer material is applied to the carrier material by thoroughly blending the two materials and by then adding, with continued mixing, a solvent in which the carrier material is insoluble but in which the tracer material is soluble. When the application of the tracer material to the carrier material is complete, the tracer additive is dried in any conventional way which insures complete removal therefrom of the solvent.

Examples of suitable tracer applicator solvents are water, where a water-soluble tracer material is employed to coat a water-insoluble carrier material, such as calcium carbonate, and methanol, where a methanol-soluble tracer material, such as a FD&C acid color, is employed to coat a methanol-insoluble carrier, such as sodium chloride.

The following proportions for the preparation of the tracer additive and for the admixture of the tracer additive to the micro-ingredient are recommended: from 0.5 to 5% of the tracer material, or dye, to the carrier material; and the tracer additive should be added to the micro-ingredient in such proportion as to provide 10–100 parts per million of tracer material in the final feed mix.

By way of example: a commercially available form of sodium chloride, produced by the Leslie Salt Company and known by the brand name "Leslie Vacuum 500," was used as the carrier material; FD&C Red #2 was used as the tracer material; and methanol was used as the solvent. 2500 grams of the salt and 25 grams of the tracer material were thoroughly mixed together in a Hobart mixer. While the mixing was continued, 200 cubic centimeters of methanol were slowly added. The color of the mix changed from pale pink to bright red, and the mixing was continued until the mix appeared uniform. The mix was then dried, sifted through a 30 mesh screen to remove lumps, and sifted through a 150 mesh screen to remove fines.

The following is a second example of preparation of the tracer additive: calcium carbonate, produced by the C. K. Williams Company and known by the brand name "Marbelwhite 80," was employed as the carrier, with the fines being first removed by sifting through a 150 mesh screen; FD&C Blue #2 was employed as the tracer material; and water was employed as the solvent. 20.0 grams of the calcium carbonate and 0.200 gram of the tracer material were thoroughly mixed together by hand in a small container. While the mixing was continued, 7.5 cubic centimeters of water were slowly added to the mixture. The color of the mix changed from pale to deep blue, and the mixing was continued until the mix appeared uniform. The mix was then dried and sifted, as before mentioned in connection with the first example given.

The tracer additive is added to the feed supplement, or micro-ingredient, in a quantity sufficient to constitute 10–100 parts per million of the final mixed feed. The supplement and tracer additive are blended thoroughly together to give a mixture which is as homogeneous as possible. The supplement-tracer additive mixture may then be handled as the supplement material is conventionally handled, i. e. packaged, stocked, stored, and sold, and eventually mixed thoroughly with feed to form a final mixed feed.

The equipment and material to be used for the detection and quantitative determination of the micro-ingredient in the final mixed feed may consist of the following: Whatman #1 filter paper, circular in form and having a diameter of about 15 centimeters; Corning #8080 50 ml. centrifuge tubes; an atomizer of the nasal spray type, or the like; a hot plate; and a quantity of carbon tetrachloride or chloroform.

A sample of the mixed feed, such as 5.0 grams thereof or about 10 ml. in volume thereof, is transferred to a centrifuge tube. Carbon tetrachloride or chloroform is added to the tube to bring the contents thereof to about the level of the 30 ml. mark, and the tube is then swirled to thoroughly wet the feed sample. After allowing the tube to stand vertically for about one-half of a minute, the floating feed and the solvent, or heavy liquid, is carefully decanted off, avoiding the loss of sediment. This procedure is repeated with another 15 ml. of solvent, and the tube is then heated to evaporate the residual solvent. A sheet of filter paper is then placed horizontally on a clean surface or on the open top of such as an 800 ml. beaker. The dry sediment material in the centrifuge tube, which sediment material contains all of the tracer additive which was present in the feed sample, is transferred onto the paper by rotating the tube at an increasing angle over the paper and moving the tube so that the sediment material is spread with some degree of uniformity onto the paper.

A solvent for the tracer material on the carrier material of the tracer additive is then sprayed onto the filter paper to moisten both paper and the sediment material thoroughly while avoiding an excess of solvent. Since it is immaterial wether or not the carier material is dissolved by this solvent, either methanol or water, by way of example, may be employed to dissolve the tracer material of each of the tracer additive examples above-given. If the tracer constituent of the particular tracer additive employed should require development before it imparts a visible color stain to the filter paper, then a suitable reagent, such as dilute alkali for phenolphthalein, ammonia for copper salts, and so forth, should be sprayed upon the filter paper, rather than water or methanol.

As soon as the first spots of coloration appear on the paper as a result of the dissolving of the tracer material, and such appear in about one-half minute, the filter paper is dried on the hot plate. As soon as the paper is dry, it may be brushed clean of adhering sediment, and the spots produced by the tracer material constituent of the tracer additive may be counted. This may be done by direct visual examination, circling each spot with a pencil marking. Moderate transmitted light is usually satisfactory, although the use of a low-power glass is sometimes helpful. The number of spots appearing on the filter paper is proportional to the amount of tracer additive present in the mixed feed, and since there is a predetermined weight relation between the feed and the micro-ingredient the number of filter paper spots is proportional to the amount of micro-ingredient in the mixed feed. The tracer additive described in the first example above given yields ten spots per 5.0 grams of mixed feed when the mixed feed contains 10 parts per million of tracer additive.

Several tracer additives may be detected in the presence of each other and during the same test run by virtue of the different colors they impart to the paper. Consequently several different micro-ingredients can be individually labelled with tracer additive of different color, and later identified and determined in the presence of each other.

The tracer additives and the test procedure permit the detection of as little as 0.05 part per million of the dye, or other suitable chemical coating material, in the final mixed feed, and the determination requires but a few minutes time on the part of the person running the test.

What is claimed is:

1. A method adapted for the detection and quantitative determination of micro-ingredients in mixed feeds comprising introducing discrete particles of material having a colored surface coating into a feed supplement and forming a substantially uniform mixture consisting of known amounts by weight of said material and supplement, forming a second substantially uniform mixture consisting of a known minor amount by weight of said first-mentioned mixture and a known major amount by weight of feed, sampling said second mixture by removing therefrom a given amount by weight, separating by flotation said discrete coated particles within the sample from substantially the balance of said sample by adding to said sample a liquid having a specific gravity intermediate that of said material and those of said feed supplement and said feed, said liquid being such as to not dissolve said coating or said particles, spreading said particles out on a porous absorbent surface against which the color produced by said coating is visible, and washing said coating from said particles onto said surface.

2. The method of claim 1 wherein: said discrete particles of material consist of sodium chloride having a particle size within the range of 30–150 mesh; said surface coating consists of FD&C Red #2 color; said known amounts by weight of said material and said feed supplement and of said first-mentioned mixture and said feed being such that said material is present in said second-mentioned mixture in from 10 to 100 parts per million; and said liquid is taken from the group consisting of carbon tetrachloride and chloroform.

3. The method of claim 1 wherein: said discrete particles of material consist of calcium carbonate having a particle size within the range of 30–150 mesh; said surface coating consists of FD&C Blue #2 color; said known amounts by weight of said material and said feed supplement and of said first-mentioned mixture and said feed being such that said material is present in said second-mentioned mixture in from 10 to 100 parts per million;

and said liquid is taken from the group consisting of carbon tetrachloride and chloroform.

4. The method of claim 1 where: said discrete particles have a particle size within the range of below one micron to 30 mesh and are formed of a material having a specific gravity in excess of 1.4–1.6; said colored surface coating constitutes from 0.5% to 5.0% by weight of said coated particles, and is soluble in a solvent in which the material forming said particles is insoluble; said known amounts by weight of said material and said feed supplement and of said first-mentioned mixture and said feed being such that said material is present in said second-mentioned mixture in from 10 to 100 parts per million; and said liquid is taken from the group of liquids having a specific gravity of 1.4–1.6 and having no solvent action on said material and said surface coating.

5. A method adapted for the detection and quantitative determination of micro-ingredients in mixed feeds comprising introducing discrete particles of material having a colored surface coating into a feed supplement to form a substantially uniform mixture consisting of known amounts by weight of said material and supplement, forming a second substantially uniform mixture consisting of a known minor amount by weight of said first-mentioned mixture and a known major amount by weight of feed, sampling said second mixture by removing therefrom a given amount by weight, separating from the sample so taken the discrete coated particles therein, and counting said separated particles.

6. A method adapted for the detection and quantitative determination of micro-ingredients in mixed feeds comprising introducing discrete particles of material having a colored surface coating into a food supplement to form a substantially uniform mixture consisting of known amounts by weight of said material and supplement, forming a second substantially uniform mixture consisting of a known minor amount by weight of said first-mentioned mixture and a known major amount by weight of feed, sampling said second mixture by removing therefrom a given amount by weight, separating from the sample so taken the discrete coated particles therein and disposing said particles in spaced relation with each other on a surface which will absorb said colored surface coating and against which the color produced by said coating is visible, and washing said coating from said particles onto said surface.

References Cited in the file of this patent

UNITED STATES PATENTS

| | | |
|---|---|---|
| 2,550,726 | Searle | May 1, 1951 |
| 2,685,517 | Dunmire | Aug. 3, 1954 |
| 2,712,997 | Cooley | July 12, 1955 |